United States Patent
Asai

(10) Patent No.: US 7,281,654 B2
(45) Date of Patent: Oct. 16, 2007

(54) ORDER MANAGEMENT SYSTEM

(75) Inventor: Arito Asai, Asaka (JP)

(73) Assignee: Fujifilm Corporation, Tokyo (JP)

( * ) Notice: Subject to any disclaimer, the term of this patent is extended or adjusted under 35 U.S.C. 154(b) by 262 days.

(21) Appl. No.: 11/032,210

(22) Filed: Jan. 11, 2005

(65) Prior Publication Data

US 2005/0150950 A1 Jul. 14, 2005

(30) Foreign Application Priority Data

Jan. 13, 2004 (JP) .............................. 2004-005081

(51) Int. Cl.
*G06K 15/00* (2006.01)
(52) U.S. Cl. ..................... 235/383; 705/26; 705/27
(58) Field of Classification Search ................ 235/383; 705/26, 27, 35–45
See application file for complete search history.

(56) References Cited

U.S. PATENT DOCUMENTS

| | | | | |
|---|---|---|---|---|
| 5,715,314 A | * | 2/1998 | Payne et al. | ................... 705/78 |
| 5,960,411 A | * | 9/1999 | Hartman et al. | ............... 705/26 |
| 7,120,595 B2 | * | 10/2006 | Alexander | ................... 705/26 |

FOREIGN PATENT DOCUMENTS

| | | | |
|---|---|---|---|
| EP | 0 927 945 | * | 7/1999 |
| EP | 0 902 381 | * | 11/1999 |
| JP | 2001-357317 A | | 12/2001 |

OTHER PUBLICATIONS

Internet article "How Domain Name Servers Work" by Marshall Brain at howstuffworks.com.*
Internet printout of www.archive.org results for the URL http://computer.howstuffworks.com/dns.htm.*

* cited by examiner

*Primary Examiner*—Daniel Hess
(74) *Attorney, Agent, or Firm*—Birch, Stewart, Kolasch & Birch, LLP

(57) ABSTRACT

A disk inscribed with the identification code of a store is distributed to a user. The disk is inserted into the client computer of the user and software, which is for ordering merchandise or the like, stored on the disk is installed in the computer. The identification code is input to the client computer and is transmitted from the client computer to a server computer. The IP address of the store is retrieved by the server computer from a database based upon the identification code, and the IP address retrieved is transmitted to the client computer. When the user enters the content of an order to the client computer, the entered content of the order is transmitted to a store computer located at the store having the IP address that was transmitted from the server computer. Thus the user is capable of ordering merchandise from this store.

12 Claims, 13 Drawing Sheets

Fig. 2

IDENTIFICATION CODE : 0 0 0 1 1 2 3 4 9
                                                      STORE   SERIAL  CHECK
                                                      CODE    NO.    DIGIT

Fig. 4

STORE DATABASE

| STORE CODE | IP ADDRESS |
|---|---|
| 0001 (STORE SA) | 211.0.144.2 |
| 0002 (STORE SB) | 202.234.143.2 |
| ⋮ | ⋮ |

Fig. 7

IDENTIFICATION-CODE INPUT IMAGE

ENTER IDENTIFICATION CODE

ORDER-CONTENT INPUT IMAGE

STORE SA

~61  ~71 FORMAT  ~81 YEN
~62  ~72 FORMAT  ~82 YEN
~63  ~73 FORMAT  ~83 YEN

OK ~91    TOTAL:___YEN ~92

ORDER MANAGEMENT SYSTEM

BACKGROUND OF THE INVENTION

1. Field of the Invention

This invention relates to an order management system, a client computer and server computer that constitute this order management system, methods of controlling the client and server computers, and programs for controlling these computers.

2. Description of the Related Art

It has become possible to accept orders for merchandise using the Internet at franchise stores such as supermarkets and convenience stores. In such a system, store information such as the addresses of franchise stores is stored in a computer located at the headquarters of the franchise, and order information from an orderer also is transmitted to the computer at the franchise headquarters. Based upon the address of the orderer, information concerning a franchise store near the address of the orderer is transmitted to the orderer (for example, see the specification of Japanese Patent Application Laid-Open No. 2001-357317).

In a system of this kind, the franchise store with which an order is to be placed is decided automatically from the address of the orderer and the address of the franchise store.

SUMMARY OF THE INVENTION

An object of the present invention is to so arrange it that the store side is given the initiative regarding the destination of an order.

According to a first aspect of the present invention, the foregoing object is attained by providing an order management system that includes a client computer and a server computer that are capable of communicating with each other.

The client computer includes an identification-code reader for reading an identification code for identifying a store, and an identification-code transmitter for transmitting the identification code, which has been read by the identification-code reader, to the server computer.

The server computer includes a search device (search means) for searching a database, in which identification codes and addresses of store computers have been stored in correspondence with each other, and retrieving an address of a store computer located at a store that corresponds to an identification code that has been transmitted from the identification-code transmitter of the client computer, and an address-data transmitter for transmitting data, which represents the address retrieved by the search device, to the client computer.

The client computer further includes an order-information input device for inputting order information, and an order-information transmitter for transmitting order information, which has been input from the order-information input device, to a store computer having an address specified by address data that has been transmitted from the address-data transmitter of the server computer.

In accordance with the first aspect of the present invention, recording media such as CD-ROMs (Compact Disc— Read-Only Memories) on which ordering software has been stored are distributed from stores to a user. The user to which a recording medium has been distributed installs the ordering software from the medium to a personal computer (client computer) located at the residence of the user. When this is done, order information can be issued to a store in the following manner:

The recording medium is marked with an identification code that is capable of identifying the store that distributed the recording medium (the recording medium need not necessarily be marked and the identification code may be printed on paper separate from the recording medium), and the identification code that identifies the store by the mark is recognized by the user. In response to the identification code being input to the client computer by the user (by the input device), the identification code is read by the client computer. When the identification code is read, the identification code is transmitted from the client computer to the server computer.

When the identification code transmitted from the client computer is received by the server computer, a database in which identification codes and the addresses of store computers have been stored in correspondence with each other is searched by the server computer. The address of the store computer located at the store specified by the transmitted identification code is retrieved by the search. Data representing the retrieved address is transmitted from the server computer to the client computer.

The address data transmitted from the server computer is received by the client computer. Order information is input at the client computer. The entered order information is transmitted to the store computer having the address represented by the received address data.

The order information transmitted from the user is transmitted to the store computer located at the store that distributed the recording medium storing the ordering software. Thus the store can decide the destination of the order from the user. Further, in a case where the store is a franchise store or the like, the content of the order information from the user need not be reported to the franchise headquarters.

According to a second aspect of the present invention, the foregoing object is attained by providing a client computer that constitutes the order management system described above.

A client computer according to the second aspect of the present invention comprises: an identification-code reader for reading an identification code for identifying a store; an identification-code transmitter for transmitting the identification code, which has been read by the identification-code reader, to a server computer; a first address-data receiver for receiving address data transmitted from the server computer, the address data representing an address of a store computer obtained by searching a database, in which identification codes and addresses of store computers have been stored in correspondence with each other, at the server computer in response to transmission of the identification code from the identification-code transmitter to the server computer; a first order-information input device for inputting order information; and an order-information transmitter for transmitting the order information, which has been input from the first order-information input device, to the store computer having the address specified by the address data received by the first address-data receiver.

The second aspect of the present invention also provides a control method suited the above-described client computer. Specifically, the method comprises the steps of: reading an identification code for identifying a store; transmitting the identification code read to a server computer; receiving address data transmitted from the server computer, the address data representing an address of a store computer obtained by searching a database, in which identification codes and addresses of store computers have been stored in correspondence with each other, at the server computer in response to transmission of the identification code to the server computer; inputting order information; and transmitting the input order information to the store computer having the address specified by the received address data.

The second aspect of the present invention also provides a program for controlling the above-described client computer as well as a recording medium on which the program has been stored.

In accordance with the second aspect of the present invention, an identification code is read in a manner similar to that of the first aspect of the invention. The read identification code is transmitted to a server computer, and the server computer retrieves the address corresponding to the identification code from a database. The data representing the retrieved address is transmitted from the server computer to the client computer. The client computer receives the identification data that has been transmitted from the server computer. Order information is entered at the client computer and the entered order information is transmitted to the store computer having the address specified by the received identification data. The destination of the order from the user can thus be specified utilizing the identification code.

The client computer may further include a first display controller (first display control means) for controlling a display device so as to display a first order-information input image for a store where a store computer is located having an address specified by address data that has been received by the first address-data receiver. In this case, the first order-information input device would input order information using the first order-information input image displayed based upon a control device in the first display controller.

Order information that has been entered using the first order-information input image is transmitted from the client computer to the store computer specified by identification code.

Further, the first display controller may control the display device so as to display a second order-information input image that has an acceptance area for accepting a request for issuing an order to another store in addition to the store where a store computer is located having an address specified by address data that has been received by the address-data receiver. In this case, the first display controller would include a request-data transmitter for transmitting request data, which requests address data of another store, to the server computer in response to clicking of the acceptance area; a second address-data receiver for receiving the address data of the other store, which is transmitted from the server computer, in response to transmission of request data from the request-data transmitter; and a second display controller (second display control means) (which may be the same as the first display control means) for controlling the display device so as to display an order-input image for a store where a store computer is located having an address specified by address data that has been received by the second address-data receiver.

The first order-information input image includes an acceptance area for accepting a request for issuing an order to another store. If this area is clicked, data requesting address data of the other store is transmitted from the client computer to the server computer. Upon receiving the request data, the server computer retrieves the address of the other store by conducting a search. The address data of the other store is transmitted from the server computer to the client computer. When this occurs, an order-input image for the other store is displayed. Thus, an order can be issued to the other store.

According to a third aspect of the present invention, the foregoing object is attained by providing a server computer that constitutes the order management system.

A server computer according to the third aspect of the present invention comprises: an address-data receiver for receiving address data representing an address of a store computer transmitted from the store computer; a database updating device which, from among addresses of a database in which identification codes and addresses of store computers have been stored in correspondence with each other, is for updating a corresponding address to an address represented by the address data that has been received by said address-data receiver; a first search device for retrieving an address of a store computer, which corresponds to an identification code that has been transmitted from a client computer, from the database whereof the address is updated by said updating device; and a first address-data transmitter for transmitting data, which represents the address that has been retrieved by said first search device, to the client computer.

The third aspect of the present invention also provides a method of controlling the above-described server computer. Specifically, the method comprises the steps of: receiving address data representing an address of a store computer transmitted from the store computer; from among addresses of a database in which identification codes and addresses of store computers have been stored in correspondence with each other, updating a corresponding address to the address represented by the received address data; retrieving an address of a store computer, which corresponds to an identification code that has been transmitted from a client computer, from the database whereof the address is updated at the updating step; and transmitting data representing the retrieved address to the client computer.

The third aspect of the present invention also provides a program for controlling the above-described server computer as well as a recording medium on which the program has been stored.

In accordance with the third aspect of the present invention, address data representing an address of a store computer is transmitted from the store computer to a server computer. When the address data that has been transmitted from the store computer is received by the server computer, the server computer updates the corresponding address among the addresses of a database in which identification codes and the addresses of store computers have been stored in correspondence with each other.

When an identification code is transmitted from a client computer, the address corresponding to the identification code is read from the database. Data representing the read address is transmitted from the server computer to the client computer.

In accordance with the third aspect of the present invention, address data of a store computer corresponding to an identification code can be transmitted to a client computer in response to a request from the client computer. The owner of the store in which the store computer is located is capable of notifying the customer, who is the user of the client computer, of the address of the store computer installed at his own store.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 illustrates an example of an identification code;

FIG. 4 illustrates an example of identification codes and IP addresses that have been stored in a store database;

FIG. 7 illustrates an example of an identification-code input image;

FIG. 8 illustrates an example of an order-content input image;

DESCRIPTION OF THE PREFERRED EMBODIMENTS

Preferred embodiments of the present invention will now be described in detail with reference to the accompanying drawings.

Figure 1:
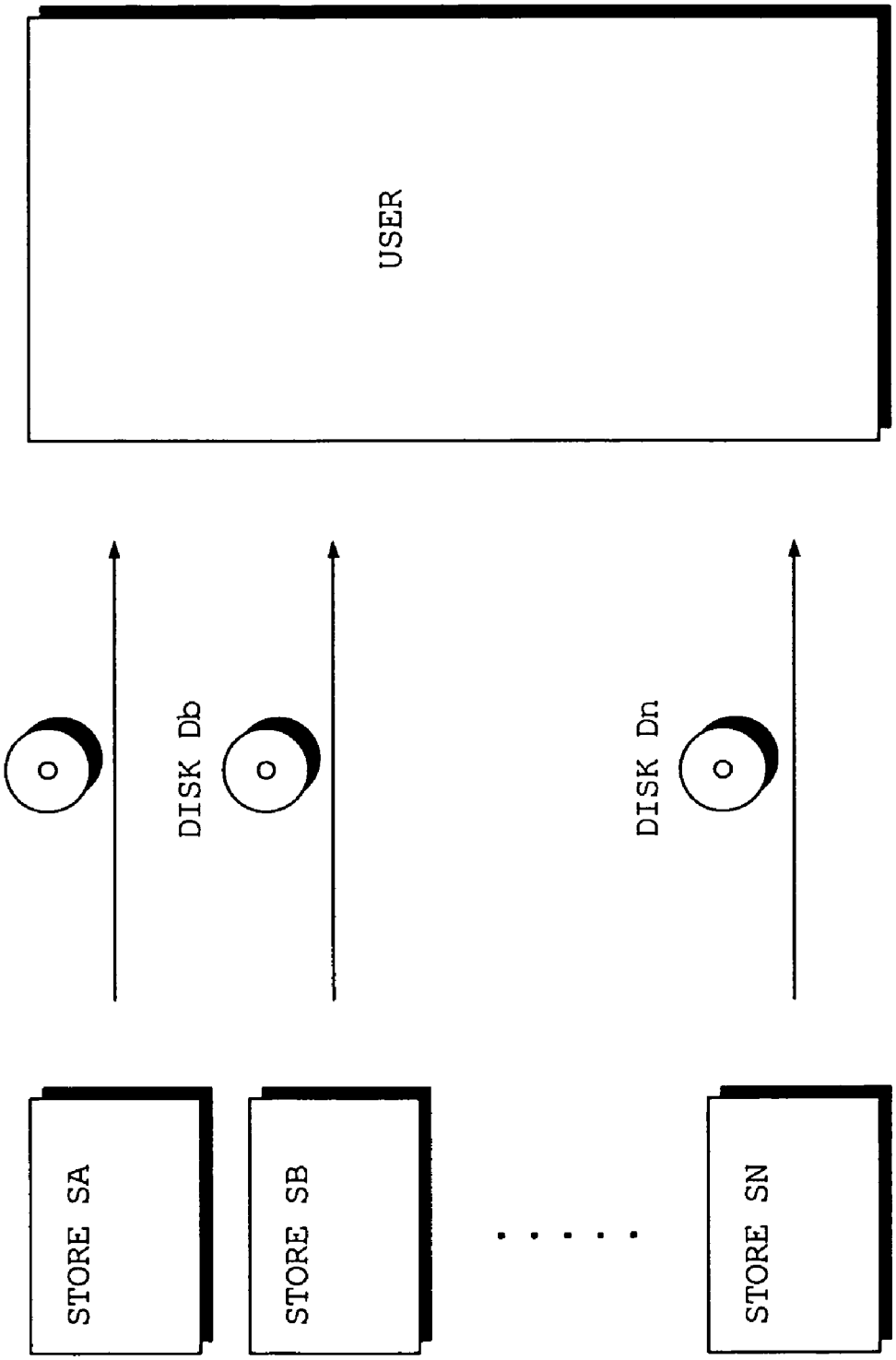
FIG. 1 is a diagram illustrating the manner in which disks on which ordering software has been stored are distributed to a user.

FIG. 1 is a diagram useful in describing an embodiment of the present invention and illustrates an example software distribution according to this embodiment.

This embodiment is adapted to accept an order from a user (customer) via the Internet (though the network may be one other the Internet).

This embodiment assumes the existence of a number of stores SA to SN. (Though it is considered here that the stores belong to a franchise chain, they need not necessarily belong to such a chain.) Each of the stores SA to SN is provided with a store computer located within the store. The stores SA to SN distribute disks (CD-ROMs or the like) Da to Dn, respectively, to a user. Each disk has an identification code specific to a respective one of the stores SA to SN inscribed on the disk package or on the disk itself. The identification code need not necessarily be inscribed on the package or disk and may be printed on a sheet of paper that is separate from the disk. The user who has received the disk inserts it into a personal computer located at the user residence, etc. When this is done, ordering software that has been stored on the disk is installed in the personal computer and an order can be placed with the store of this disk using this ordering software. (The ordering software need not be stored on a disk and may be stored on another medium such as a memory card.)

A particular feature of this embodiment is that an order is placed with the store that distributed the disk, or the store that distributed the disk is given precedence in accepting an order. Thus a store that has distributed a disk storing the ordering software is capable of having prospective orders come to the same store.

FIG. 2 illustrates an example of an identification code inscribed on a disk.

The identification code includes a 4-digit store code, a 4-digit serial number and a single check digit. The store code is specific to the store and the store can be identified by the store code. The serial number is for checking the number of disks distributed on a per-store basis. Of course, the identification code may consist solely of the store code.

Figure 3:
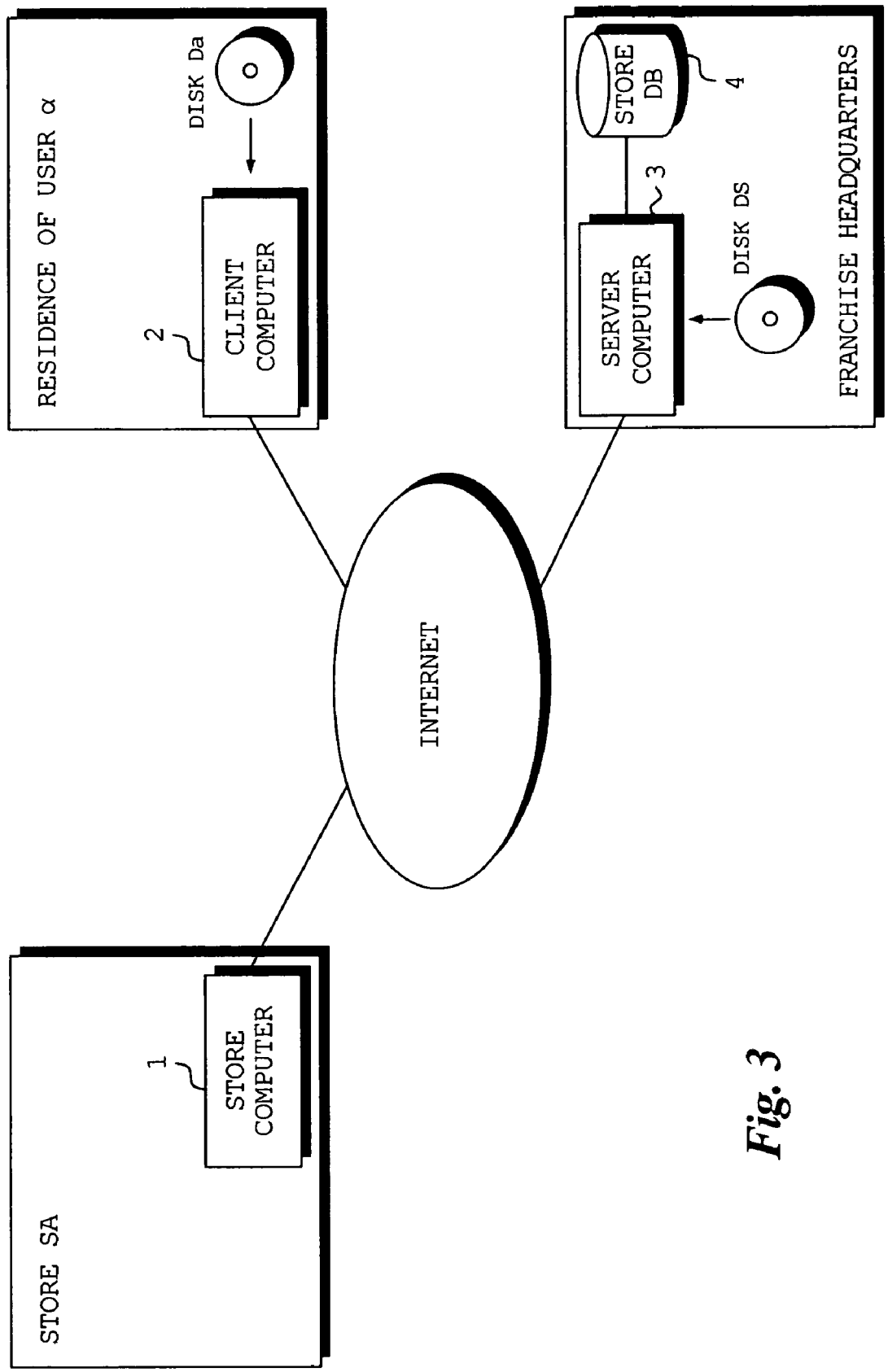
FIG. 3 illustrates an overview of an ordering system.

FIG. 3 illustrates an overview of an ordering system according to this embodiment.

Described below is a case where an order is placed by a user α using the-ordering software that has been stored on the disk Da distributed to the user α by the store SA.

As mentioned above, a store computer 1 has been deployed at the store SA. The store computer 1 is capable of being connected to the Internet.

A personal computer (client computer) 2 is located at the residence of the user a who has received the disk Da. Ordering software that has been stored on the disk Da is installed in the client computer 2 by inserting the disk Da into the computer. The client computer 2 operates in accordance with the installed ordering software.

The headquarters of a franchise chain is provided with a server computer 3. A disk Ds is inserted into the server computer 3 and server software that has been stored on the disk Ds is installed in the server computer 3, whereby the server computer executes processing described later. A store database 4 is connected to the server computer 3. Store codes specific to stores and IP (Internet Protocol) addresses of store computers that have been installed at these stores are stored in the store database 4 in correspondence with each other.

It goes without saying that the store computer 1, client computer 2 and server computer 3 each include a communication circuit for accessing the Internet, a CPU, a display unit, an input unit and a storage device.

FIG. 4 illustrates a table indicating store codes and IP addresses stored in the store database 4.

Store codes specific to each of the stores and IP addresses of the store computers located at each of these stores are stored in the store database 4 in correspondence with each other. IP addresses may be static or dynamic. In case of a static IP address, it will suffice to store the IP address in the store database 4 from the start. In case of a dynamic IP address, data representing the IP address is transmitted from the store computer 1 (in case of a dynamic IP address, the address is allocated whenever the store computer 1 accesses the Internet) to the server computer 3 whenever the power supply of the store computer located at each store is turned on, and the corresponding IP address among the IP addresses that have been stored in the server computer 3 is updated.

Figure 5:
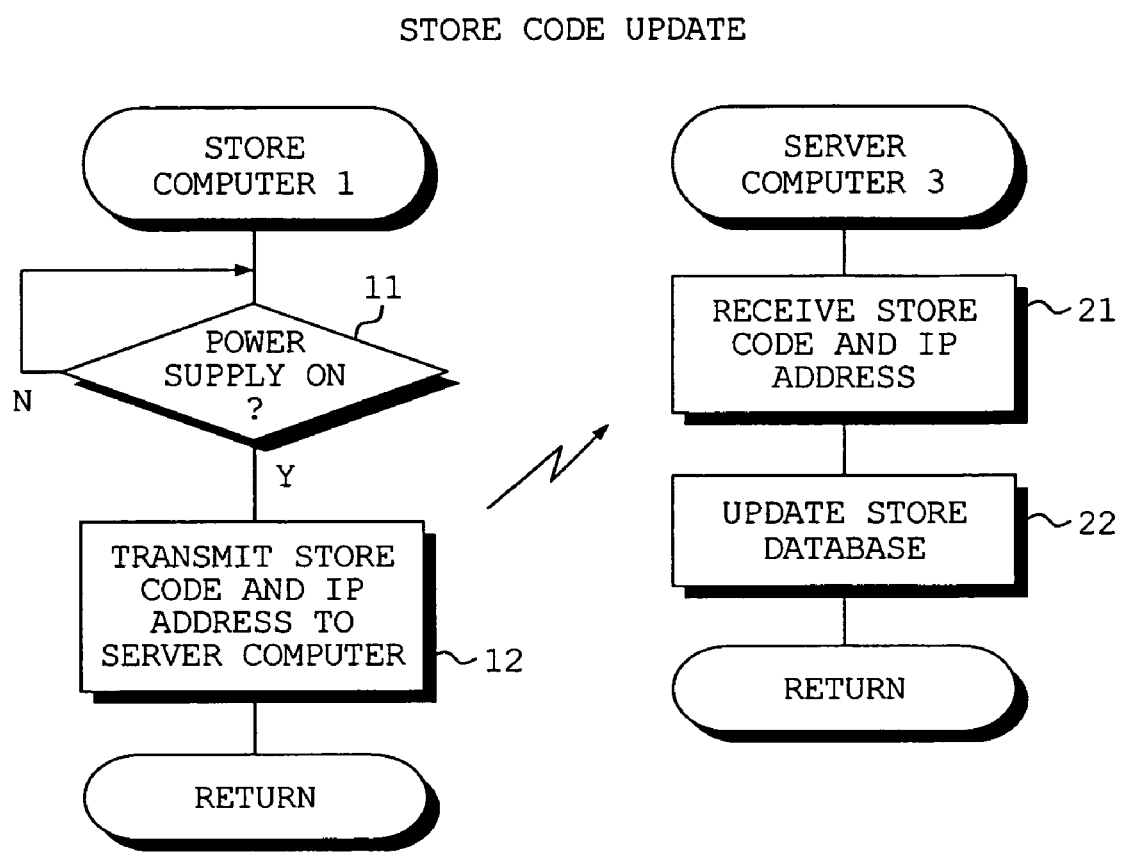
FIG. 5 is a flowchart illustrating store-code update processing.

FIG. 5 is a flowchart illustrating processing executed by the store computer 1 and by the server computer 3 for updating a store code. The IP address of the store computer 1 is the dynamic IP address.

When the power supply of the store computer 1 is turned on ("YES" at step 11), the store code (this store code is the same as that included in the identification code inscribed on the disk Da distributed by the store SA and has been stored in the storage device of the store computer 1. The store code is read out from the storage device.) and data representing the assigned IP address are transmitted from the store computer 1 to the server computer 3 (step 12).

When the IP address data transmitted from the store computer 1 is received by the server computer 3 (step 21), the corresponding IP address among the IP addresses that have been stored in the store database 4 is updated (step 22). It goes without saying that both the store code and the IP address are written anew at the time of an initial setting.

Figure 6:
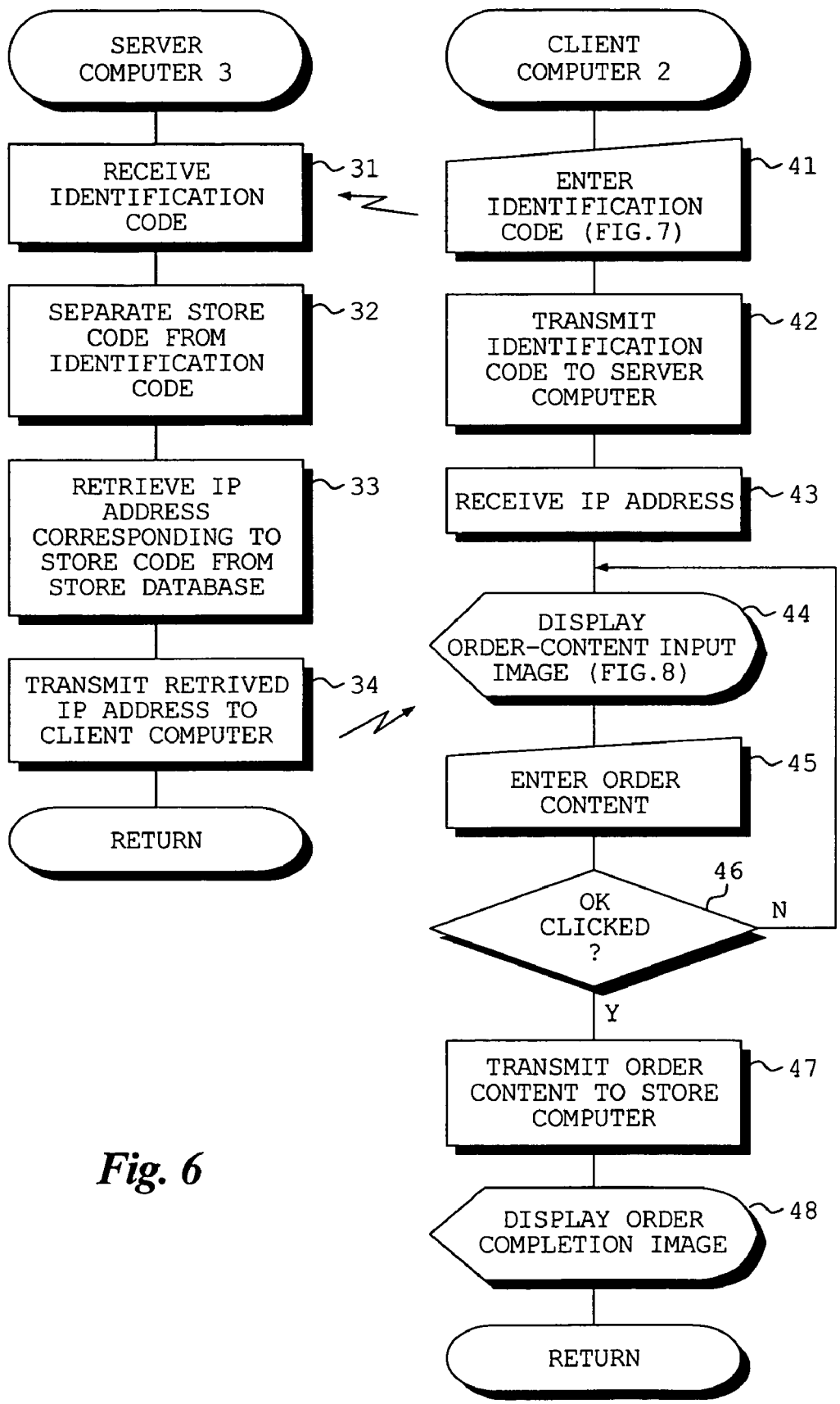
FIG. 6 is a flowchart illustrating processing executed by a server computer and by a client computer.

FIG. 6 is a flowchart illustrating processing in a case where the user α places an order in accordance with the ordering software that has been stored on the disk Da.

When ordering software that has been installed in the client computer 2 is launched, an identification-code input image illustrated in FIG. 7 is displayed on the display screen of the display unit of client computer 2.

FIG. 7 illustrates an example of the identification-code input image.

The identification-code input image includes an identification-code input area 51 and an OK area 52. The user α uses the input unit of the client computer 2 to enter the identification code that has been inscribed-on the disk Da. The entered identification code is displayed in the identification-code input area 51. Clicking the OK area 52 causes the entered identification code to be transmitted from the client computer 2 to the server computer 3.

With reference again to FIG. 6, the identification code of the disk Da is input to the client computer 2 (step 41) by the user α and the entered identification code is transmitted to the server computer 3 (step 42) in the manner described above.

When the identification code that has been transmitted from the client computer 2 is received by the server computer 3 (step 31), the store code is separated from the identification code (step 32). When the store code is separated from the identification code, the IP address corresponding to the separated store code is retrieved from the store database 4 (step 33). Since the store code of store SA is "0001", the IP address is "211.0.144.2" (see FIG. 4). The data representing the retrieved IP address is transmitted from the server computer 3 to the client computer 2 (step 34).

When the IP address data that has been transmitted from the server computer 3 is received by the client computer 2 (step 43), an order-content input image shown in FIG. 8 is displayed on the display unit of the client computer 2 (step 44).

FIG. 8 illustrates an example of the order-content input image. Though this order-content input image is for ordering a postcard, it goes without saying that the image may be used to place other kinds of orders.

The order-content input image (a first order-content input image) includes the store name (Store SA) and areas 61, 62 and 63 for displaying the images of postcards that may be ordered. Areas 71, 72 and 73 for designating the sizes of postcards to be ordered and areas 81, 82 and 83 in which the fees are displayed are provided in correspondence with the areas 61, 62 and 63. An OK area 91 and a total-fee display area 92 are provided beneath the order-content input image.

If a size is input to a size designating area provided on the right side of an area in which an image for which a postcard is to be ordered is being displayed, the fee appears in the corresponding display area. The total fee is displayed in the total-fee display area 92. If the OK area 91 is clicked, data representing that this is an order for postcards, the identification codes of the ordered postcards, the fee and the name, address and telephone number of the user α who placed the order is transmitted from the client computer 2 to the store computer 1.

With reference again to FIG. 6, when the content of the order is input by the user α (step 45) and the OK area is clicked ("YES" at step 46), then, in the manner described above, data representing the content of the order is transmitted from the client computer 2 to the store computer 1 located at the store SA that distributed the disk Da (step 47). When this occurs, an order completion image is displayed on the display screen of the display unit of client computer 2 (step 48).

When the order-content data that has been transmitted from the client computer 2 is received by the store computer 1 located in store SA, the postcards conforming to the content of the order are delivered to the residence of user α. Of course, the user α may pick up the postcards by going to the store SA that is the destination of the order. If the user α is to go to the store SA to pick up the postcards, then such information as the store name and address of the store that is the destination of the order would be displayed on the display screen of the display unit of client computer 2 at the time of the order. Of course, if the user α knows that the disk Da is exclusively that of store SA and if the store name and address have been recorded on the disk Da, then the user can pick up the postcards by going to the destination of the order.

Thus, the store SA that distributed the disk Da to the user α is capable of receiving an order from the user α at the store SA.

Figure 9:
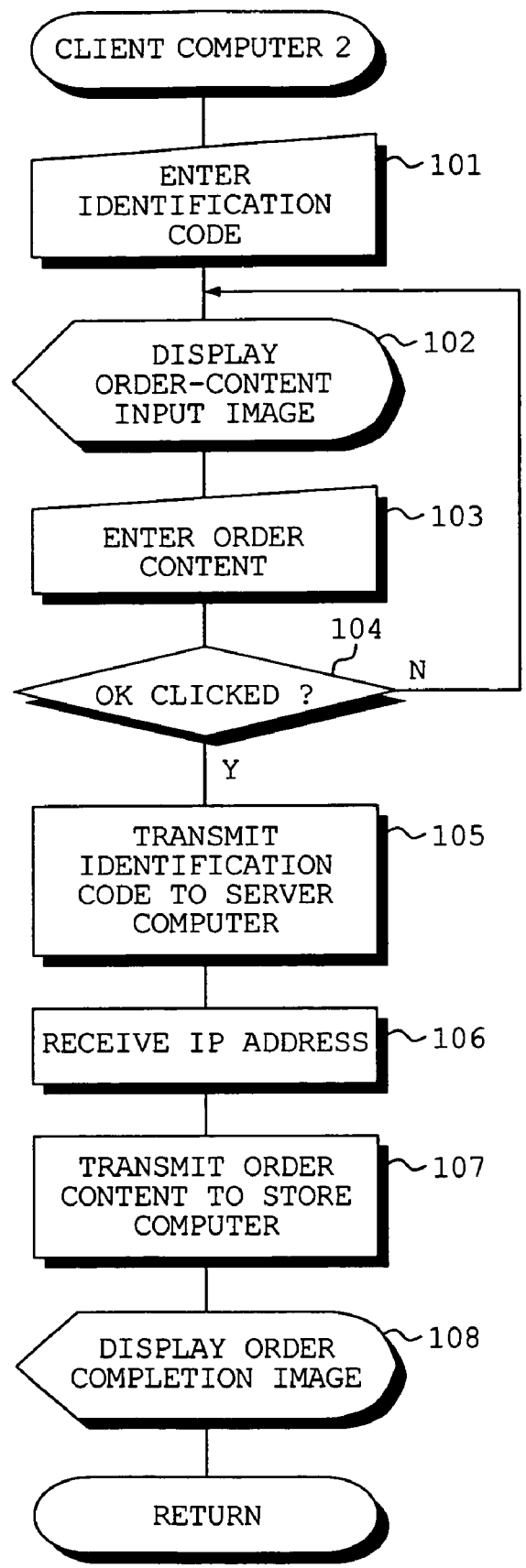
FIG. 9 is a flowchart illustrating processing executed by a client computer according to a second embodiment of the present invention.

FIG. 9 is a flowchart illustrating processing executed by the client computer 2 according to a second embodiment of the present invention.

In the embodiment described above, the content of an order is entered after an identification code has been transmitted to the server computer 3. In the processing shown in FIG. 9, however, an identification code is transmitted to the server computer 3 after the content of an order has been entered.

If an identification code is entered by the user α (step 101), the order-content input image is displayed on the display screen of the display unit of client computer 2 (step 102) in a manner similar to that described above. If the content of the order is entered in accordance with the order-content input image (step 103) and the OK area is clicked ("YES" at step 104), then the entered identification code is transmitted to the server computer 3 (step 105).

An IP address corresponding to the store code included in the identification code is retrieved at the server computer 3 by a search and is transmitted from the server computer 3 to the client computer 2 in the manner described above. When the IP address data that has been transmitted from the server computer 3 is received by the client computer 2 (step 106), data representing the entered content of the order is transmitted to the store computer 1 having the IP address specified by the received IP address data (step 107). The order completion image is displayed on the display screen of the display unit of client computer 2 (step 108).

Figure 10:
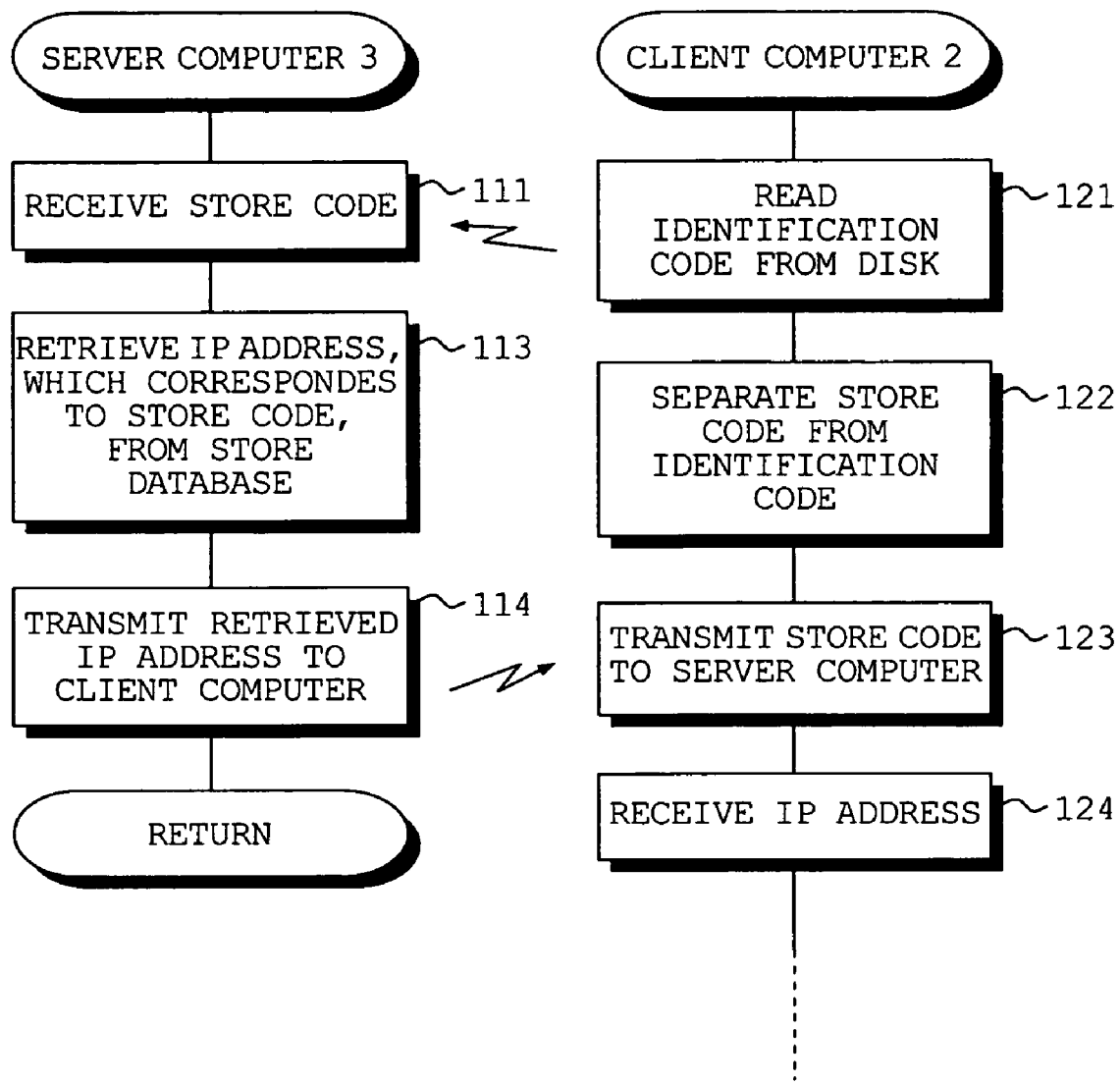
FIG. 10 is an example of a flowchart illustrating processing executed by a server computer and by a client computer according to a third embodiment of the present invention.

FIG. 10 is a flowchart illustrating processing executed by the server computer 3 and by the client computer 2 according to a third embodiment of the present invention.

In the embodiment described above, it is the server computer 3 that separates the store code from the identification code. In the processing illustrated in FIG. 10, however, this is accomplished by the client computer. Further, in the embodiment described above, the identification code is entered by the user α. In the processing of FIG. 10, however, the identification code is recorded on the disk Da and is read from the disk Da.

When the disk Da is inserted in the client computer 2, the ordering software that has been stored on the disk Da is installed in the client computer 2 and the identification code that has been recorded on the disk Da is read (step 121). The identification code that has been read is stored in the storage device of the client computer 2, where the store code is separated from the identification code (step 122). The separated store code is transmitted from the client computer 2 to the server computer 3 (step 123).

When the store code that has been transmitted from the client computer 2 is received by the server computer 3 (step 111), the IP address corresponding to the store code is retrieved (step 113). Data representing the retrieved IP address is transmitted from the server computer 3 to the client computer 2 (step 114).

When the IP address data that has been transmitted from the server computer 3 is received by the client computer 2 (step 124), the order-content data is transmitted to the store computer 1, which has this IP address, in the manner described above.

Figure 11:
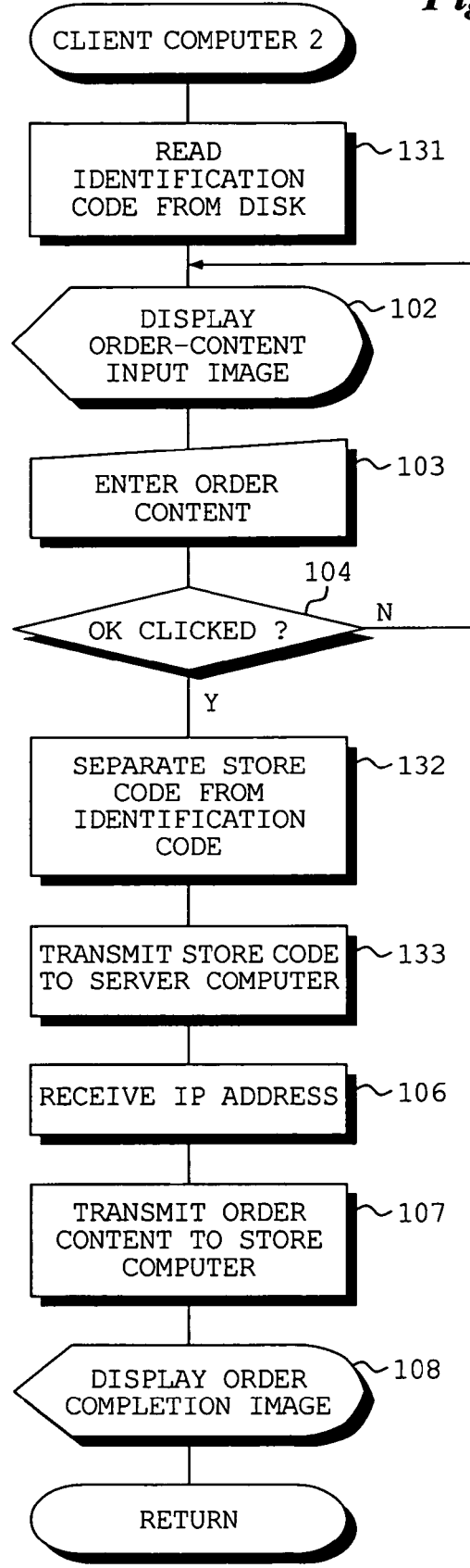
FIG. 11 is a flowchart illustrating an example of processing executed by a client computer according to a fourth embodiment of the present invention.

FIG. 11 is a flowchart illustrating processing executed by the client computer 2 according to a fourth embodiment of the invention. This processing is for separating a store code from an identification code at the client computer 2 after the content of an order has been entered and transmitting the separated store code to the server computer 3.

As mentioned above, the identification code is recorded on the disk Da and the identification code is read from the disk Da (step 131). The order-content input image is displayed on the display screen of the display unit of the client computer 2 (step 102) and the content of the order is entered (step 103). If the OK area of the order-content input image is clicked ("YES" at step 104), then the store code is separated from the identification code (step 132). The separated store code is transmitted from the client computer 2 to the server computer 3 (step 133).

As mentioned above, the IP address corresponding to the store code is retrieved by the server computer 3 and the data representing the IP address is transmitted to the client computer 2.

When the IP address data that has been transmitted from the server computer 3 is received by the client computer 2 (step 106), data representing the content of the order is transmitted to the store computer 1 having the address specified by this IP address (step 107). The order completion image is displayed on the display screen of the display unit of client computer 2 (step 108).

Figure 12:
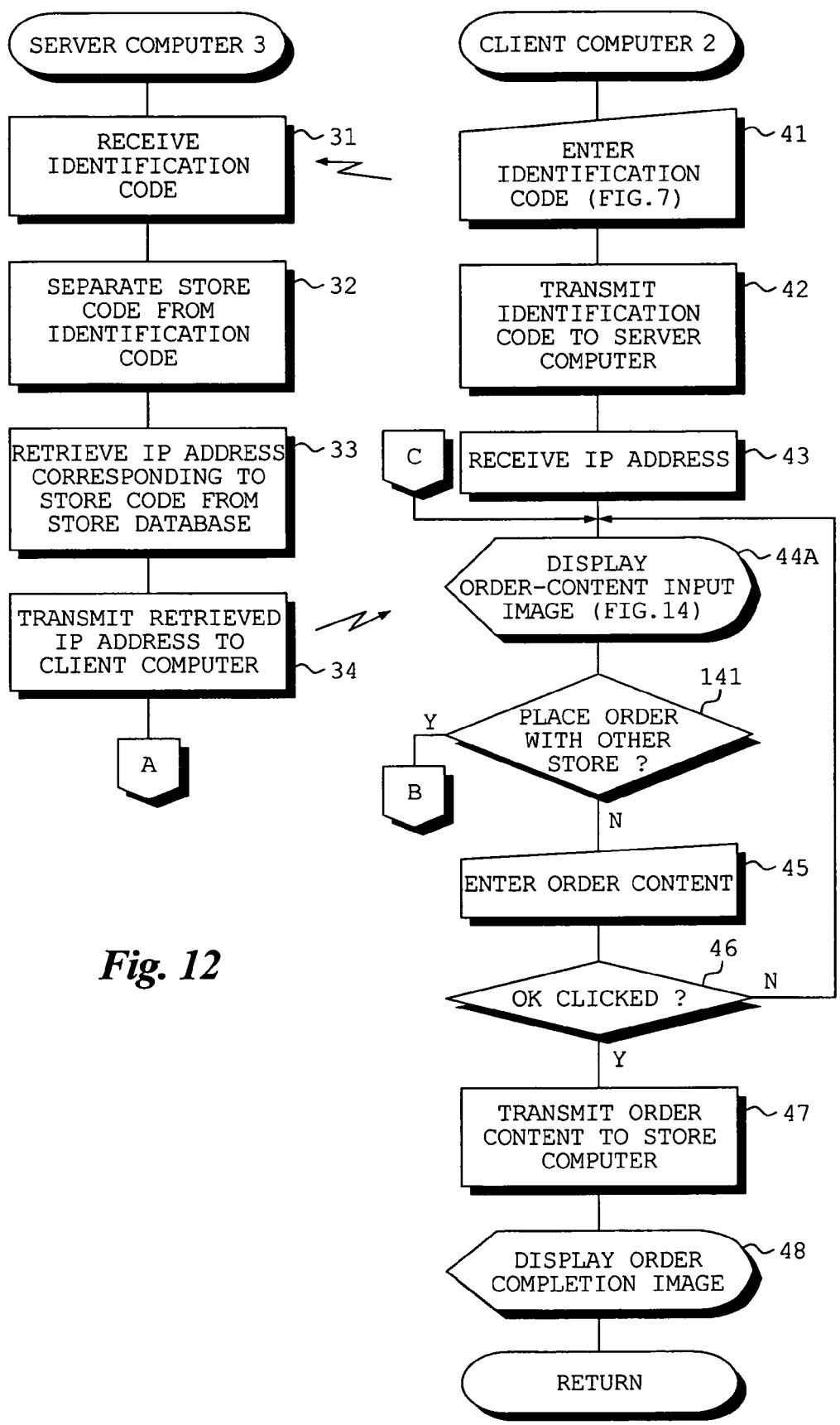
FIGS. 12 and 13 are flowcharts illustrating a portion of processing executed by a server computer and by a client computer according to a fifth embodiment of the present invention.
Figure 13:
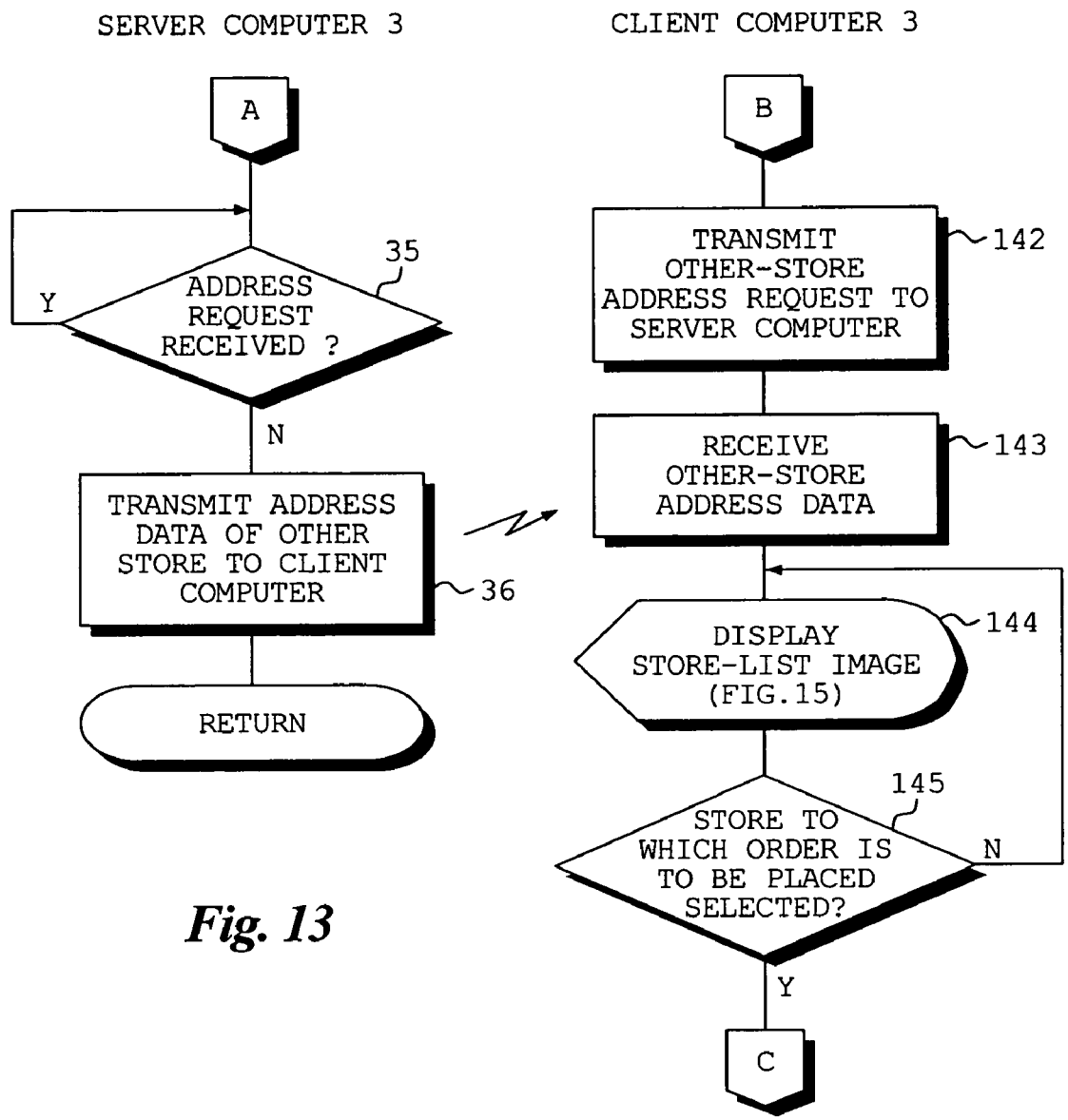
Figure 14:
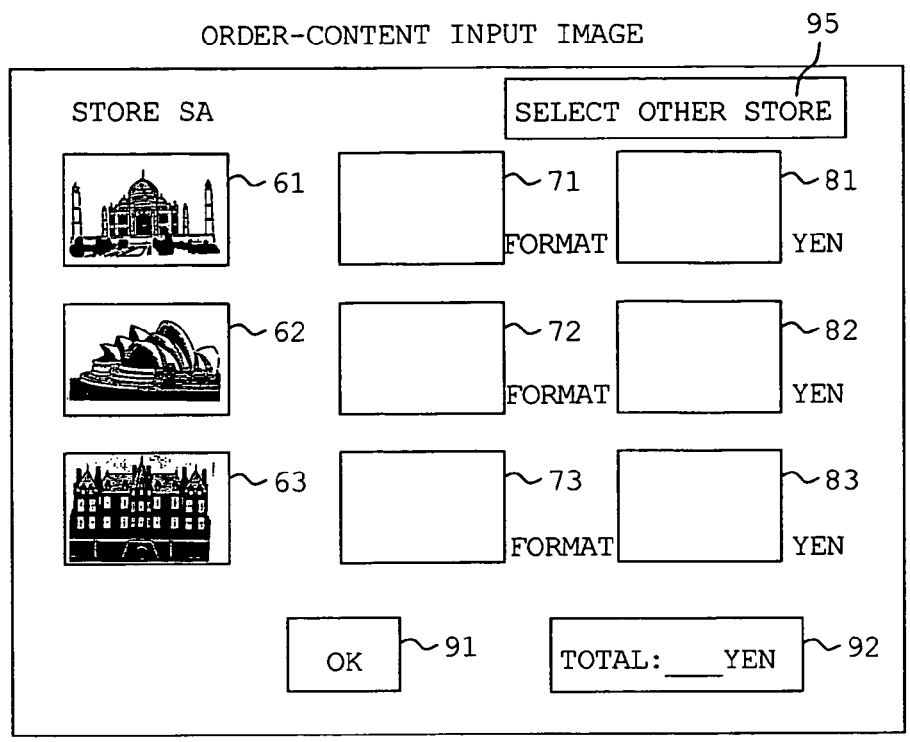
FIG. 14 illustrates an example of an order-content input image according to the fifth embodiment.
Figure 15:
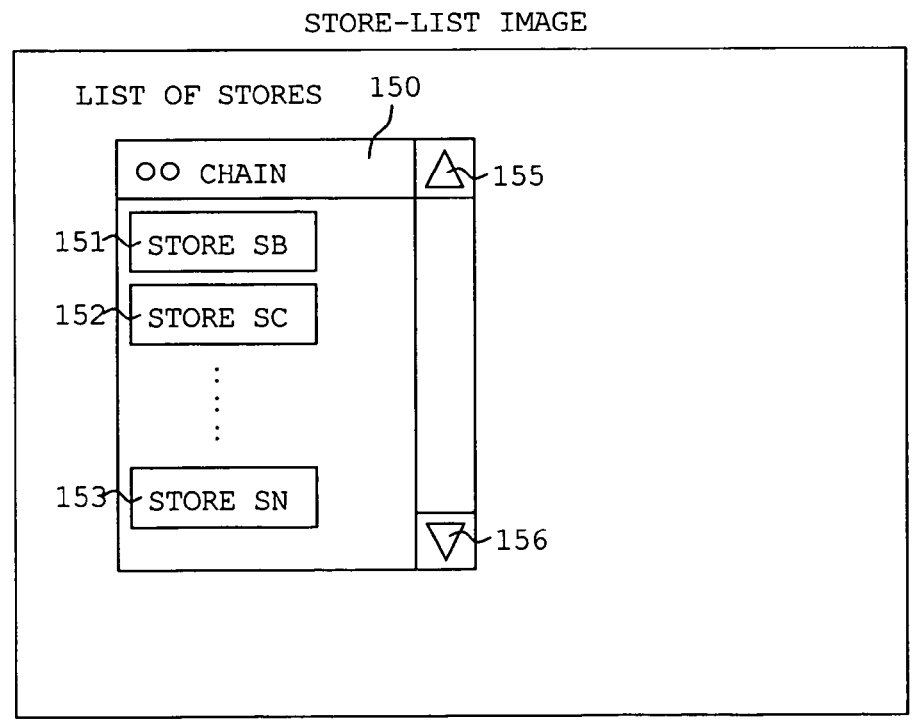
FIG. 15 illustrates an example of a store-list image according to the fifth embodiment.

FIGS. 12 to 15 illustrate a fifth embodiment of the present invention. FIGS. 12 and 13 are flowcharts illustrating processing executed by the server computer 3 and by the client computer 2, and FIGS. 14 and 15 illustrate examples of images displayed on the display screen of the display unit of client computer 2. Processing in FIGS. 12 and 13 identical with that shown in FIG. 6 is designated by like step numbers and need not be described again.

This embodiment makes it possible to place an order with a store other than the store SA that distributed the disk Da. In order to achieve this, an area 95 for selecting another store is included in the order-content input image (a second order-information input image), as illustrated in FIG. 14. In a case where an order is to be placed with a store other than the store SA that distributed the disk Da, the area 95 for selecting the other store is clicked by the user α ("YES" at step 141 in FIG. 12). When this done, a request for an IP address of another store is transmitted from the client computer 2 to the server computer 3 (step 142 in FIG. 13).

When the IP address request that has been transmitted from the client computer 2 is received by the server computer 3 ("YES" at step 35 in FIG. 13), the store database 4 is searched and IP addresses of stores other than the store SA are retrieved. The retrieved IP address data of the other stores is transmitted from the server computer 3 to the client computer 2 (step 36 in FIG. 13).

When the IP address data of the other stores transmitted from the server computer 3 is received by the client computer 2 (step 143 in FIG. 13), an image of a store list is displayed on the display screen of the display unit of client computer 2 (step 144 in FIG. 13).

FIG. 15 illustrates an example of the store-list image.

A store-list display area 150 is included in the store-list image. The store-list display area 150 includes store-name display areas 151, 152, 153 for accepting orders from the user. The store-list image also includes scroll buttons 155 and 156. Stores not being displayed in the area 150 are displayed by clicking the button 155 or 156. Areas such as these store-name display areas 151, 152, 153 are capable of being clicked. By being clicked by the user α ("YES" at step 145 in FIG. 13), the order-content input image (see FIG. 14) of the corresponding store is displayed on the display screen of the display unit of client computer 2. By entering the content of an order, data representing the entered order content is transmitted to the store computer located in the store designated by the user α. Thus, an order can be issued to the store desired by the user.

Even if this arrangement is adopted, the order-content input image for placing an order with the store SA that distributed the disk Da on which the ordering software has been stored is displayed first and therefore the store SA is given precedence with regard to orders.

As many apparently widely different embodiments of the present invention can be made without departing from the spirit and scope thereof, it is to be understood that the invention is not limited to the specific embodiments thereof except as defined in the appended claims.

What is claimed is:

1. An order management system comprising a client computer and a server computer that are capable of communicating with each other, said client computer including:

an installing device for installing order software stored on a recording medium, which has an identification code associated therewith, into said client computer;

an identification-code reader for reading the identification code for identifying a specific physical store; and an identification-code transmitter for transmitting the identification code, which has been read by said identification-code reader, to said server computer; and said server computer includes:

a search device for searching a database, in which identification codes and addresses of store computers associated with specific physical stores have been stored in correspondence with each other, and retrieving an address of a store computer located at a specific physical store that corresponds to an identification code that has been transmitted from said identification-code transmitter of said client computer; and an address-data transmitter for transmitting data, which represents the address retrieved by said search device, to said client computer;

wherein said client computer further includes:

an order-information input device for inputting order information; and an order-information transmitter for transmitting order information, which has been input from said order-information input device, to a store computer having an address specified by address data that has been transmitted from said address-data transmitter of said server computer based upon the order software installed by said installing device.

2. A client computer comprising:
an installing device for installing order software stored on a recording medium, which has an identification code associated therewith, into said client computer;
an identification-code reader for reading an identification code for identifying a specific physical store;
an identification-code transmitter for transmitting the identification code, which has been read by said identification-code reader, to a server computer;
a first address-data receiver for receiving address data transmitted from the server computer, said address data representing an address of a store computer associated with a specific physical store obtained by searching a database, in which identification codes and addresses of store computers have been stored in correspondence with each other, at the server computer in response to transmission of the identification code from said identification-code transmitter to the server computer;
a first order-information input device for inputting order information; and
an order-information transmitter for transmitting the order information, which has been input from said first order-information input device, to the store computer having the address specified by the address data received by said first address-data receiver based upon the order software installed by said installing device.

3. The client computer according to claim 2, further comprising a first display controller for controlling a display device so as to display a first order-information input image for a store where a store computer is located having an address specified by address data that has been received by said first address-data receiver;
said first order-information input device inputting order information using the first order-information input image displayed based upon a control device in said first display controller.

4. The client computer according to claim 3, wherein said first display controller controls the display device so as to display a second order-information input image that has an acceptance area for accepting a request for issuing an order to another store in addition to the store where a store computer is located having an address specified by address data that has been received by said address-data receiver;
said first display controller including:
a request-data transmitter for transmitting request data, which requests address data of another store, to the server computer in response to clicking of the acceptance area;
a second address-data receiver for receiving the address data of the other store, which is transmitted from the server computer, in response to transmission of request data from said request-data transmitter; and
a second display controller for controlling the display device so as to display an order-input image for a store where a store computer is located having an address specified by address data that has been received by said second address-data receiver.

5. A server computer comprising:
an address-data receiver for receiving address data representing an address of a store computer transmitted from the store computer;
a database updating device which, from among addresses of a database in which store codes comprising identification codes and addresses of store computers associated with specific physical stores have been stored in correspondence with each other, is for updating a corresponding address to an address represented by the address data that has been received by said address-data receiver;
a separating device for separating a store code from an identification code that has been transmitted from a client computer;
a first search device for retrieving an address of a store computer associated with a specific physical store, which corresponds to the store code that has been separated by said separating device, from the database whereof the address is updated by said updating device; and
a first address-data transmitter for transmitting data, which represents the address that has been retrieved by said first search device, to the client computer.

6. The server computer according to claim 5, further comprising:
a request-data receiver for receiving request data, which requests address data of another store transmitted from the client computer;
a second search device, for searching the database so as to retrieve the address of the other store in response to receipt of the request data by said request-data receiver; and
a second address-data transmitter for transmitting data, which represents the address retrieved by said second search device, to the client computer.

7. A method of controlling a client computer, comprising the steps of:
installing order software stored on a recording medium having an identification code associated therewith;
reading the identification code for identifying a specific physical store;
transmitting the identification code read to a server computer;
receiving address data transmitted from the server computer, said address data representing an address of a store computer associated with a specific physical store obtained by searching a database, in which identification codes and addresses of store computers have been stored in correspondence with each other, at the server computer in response to transmission of the identification code to the server computer;
inputting order information; and
transmitting the input order information to the store computer having the address specified by the received address data based upon the stored order software.

8. A method of controlling a server computer, comprising the steps of:
receiving address data representing an address of a store computer transmitted from the store computer;
from among addresses of a database in which store codes comprising identification codes and addresses of store computers associated with specific physical stores have been stored in correspondence with each other, updating a corresponding address to the address represented by the received address data;
separating a store code from an identification code that has been transmitted from a client computer;
retrieving an address of a store computer associated with a specific physical store, said address corresponding to the separated store code from the database whereof the address is updated at the updating step; and
transmitting data representing the retrieved address to the client computer.

9. An order program stored in a tangible computer-readable recording medium, having an identification code associated therewith, for controlling a client computer so as to:
- read the identification code for identifying a specific physical store;
- transmit the identification code read to a server computer;
- receive address data transmitted from the server computer, said address data representing an address of a store computer associated with a specific physical store obtained by searching a database, in which identification codes and addresses of store computers have been stored in correspondence with each other, at the server computer in response to transmission of the identification code to the server computer;
- input order information; and
- transmit the input order information to the store computer having the address specified by the received address data.

10. A recording medium storing the program set forth in claim 9.

11. A program stored in a tangible computer readable medium for controlling a server computer so as to:
- receive address data representing an address of a store computer transmitted from the store computer;
- from among addresses of a database in which store codes comprising identification codes and addresses of store computers associated with specific physical stores have been stored in correspondence with each other, update a corresponding address to the address represented by the received address data;
- separate a store code from an identification code that has been transmitted from a client computer;
- retrieve an address of a store computer associated with specific physical stores, said address corresponding to the separated store code, from the database whereof the address is updated; and
- transmit data representing the retrieved address to the client computer.

12. A recording medium storing the program set forth in claim 11.

* * * * *